United States Patent
Hunter et al.

(10) Patent No.: US 9,579,750 B2
(45) Date of Patent: Feb. 28, 2017

(54) PARTICLE CONTROL IN LASER PROCESSING SYSTEMS

(75) Inventors: Aaron Muir Hunter, Santa Cruz, CA (US); Mehran Behdjat, San Jose, CA (US); Bruce E. Adams, Portland, OR (US)

(73) Assignee: Applied Materials, Inc., Santa Clara, CA (US)

( * ) Notice: Subject to any disclaimer, the term of this patent is extended or adjusted under 35 U.S.C. 154(b) by 495 days.

(21) Appl. No.: 13/619,749

(22) Filed: Sep. 14, 2012

(65) Prior Publication Data

US 2013/0087547 A1 Apr. 11, 2013

Related U.S. Application Data

(60) Provisional application No. 61/543,763, filed on Oct. 5, 2011, provisional application No. 61/599,336, filed on Feb. 15, 2012.

(51) Int. Cl.
 *B23K 26/00* (2014.01)
 *B23K 26/12* (2014.01)
 (Continued)

(52) U.S. Cl.
 CPC .......... *B23K 26/127* (2013.01); *B23K 26/142* (2015.10); *B23K 26/1464* (2013.01)

(58) Field of Classification Search
 CPC .. A47J 27/004; A47J 27/21041; A47J 37/105; A47J 45/061; H05B 3/68;
 (Continued)

(56) References Cited

U.S. PATENT DOCUMENTS 3,626,141 A * 12/1971 Daly ................. B23K 26/0853
 219/121.68
3,866,398 A * 2/1975 Vernon, Jr. ........... B08B 15/007
 134/1.3
(Continued)

FOREIGN PATENT DOCUMENTS

JP S60-204518 A 10/1985
JP H09-040499 2/1987
(Continued)

OTHER PUBLICATIONS

International Search Report and Written Opinion for PCT/US2012/055581 dated Feb. 28, 2013.
Notice of Rejection in related application JP 2014-534584.

*Primary Examiner* — David Angwin
*Assistant Examiner* — Gyounghyun Bae
(74) *Attorney, Agent, or Firm* — Patterson + Sheridan, LLP

(57) ABSTRACT

The present invention generally relates to a laser processing systems for thermally processing substrates. The laser processing systems include a shield disposed between an energy source of the laser processing system and a substrate which is to be thermally processed. The shield includes an optically transparent window disposed adjacent to a cavity within the shield. The optically transparent window allows annealing energy to pass therethrough and to illuminate the substrate. The shield also includes one or more gas inlets and one or more gas outlets for introducing and removing a purge gas from the cavity within the shield. The purge gas is utilized to remove volatized or ablated components during thermal processing, and to provide a gas of predetermined composition, such as oxygen-free, to the thermally processed area.

19 Claims, 2 Drawing Sheets

(51) Int. Cl.
*A21B 2/00* (2006.01)
*B23K 26/14* (2014.01)

(58) Field of Classification Search
CPC .............. B23K 26/127; B23K 26/1464; B23K 26/1405; B23K 26/122; B23K 26/1423; B23K 26/123; B23K 26/0656; B23K 26/1476; B23K 26/365
USPC ............... 219/121.6, 121.83, 121.84, 121.86
See application file for complete search history.

(56) References Cited

U.S. PATENT DOCUMENTS

| | | | | |
|---|---|---|---|---|
| 4,027,137 A | * | 5/1977 | Liedtke | ........................ 219/121.7 |
| 4,382,170 A | * | 5/1983 | Klingel | ................... B23K 10/00 |
| | | | | 219/121.48 |
| 4,434,189 A | * | 2/1984 | Zaplatynsky | ............ C23C 8/24 |
| | | | | 118/50.1 |
| 4,467,171 A | * | 8/1984 | Ramos | ...................... 219/121.67 |
| 4,592,353 A | * | 6/1986 | Daikuzono | ............ A61B 18/24 |
| | | | | 219/121.6 |
| 4,609,807 A | * | 9/1986 | Morrissy | .............. B23K 26/067 |
| | | | | 219/121.67 |
| 4,715,318 A | * | 12/1987 | Kameyama | ........... C23C 16/488 |
| | | | | 118/50.1 |
| 4,801,352 A | * | 1/1989 | Piwczyk | ................ C23C 16/042 |
| | | | | 118/50.1 |
| 4,803,335 A | * | 2/1989 | Steen | .................. B23K 26/1429 |
| | | | | 219/121.6 |
| 4,828,874 A | * | 5/1989 | Hiraoka | ............ H01L 21/32137 |
| | | | | 118/50.1 |
| 4,873,413 A | * | 10/1989 | Uesugi | .................. H01L 21/268 |
| | | | | 219/121.68 |
| 4,940,508 A | * | 7/1990 | Shamouilian | ...... B23K 26/0656 |
| | | | | 216/17 |
| 4,964,940 A | * | 10/1990 | Auvert | .................... B23K 26/12 |
| | | | | 118/50.1 |
| 4,992,643 A | * | 2/1991 | Fuerschbach | ...... B23K 26/1405 |
| | | | | 219/121.63 |
| 5,085,166 A | * | 2/1992 | Oka | ........................ C23C 14/28 |
| | | | | 118/50.1 |
| 5,108,330 A | * | 4/1992 | Welsch | ..................... H01S 3/03 |
| | | | | 445/2 |
| 5,109,465 A | * | 4/1992 | Klopotek | ............... G02B 27/09 |
| | | | | 250/503.1 |
| 5,284,678 A | * | 2/1994 | Hirschfeld | ............... B01J 2/006 |
| | | | | 118/303 |
| 5,477,026 A | * | 12/1995 | Buongiorno | ....... B23K 26/1411 |
| | | | | 219/121.64 |
| 5,756,962 A | * | 5/1998 | James | ................ B23K 26/0639 |
| | | | | 219/121.6 |
| 6,118,097 A | * | 9/2000 | Kaga | .................. B23K 26/1435 |
| | | | | 219/121.5 |
| 6,316,744 B1 | | 11/2001 | Nowotny et al. | |
| 6,534,745 B1 | * | 3/2003 | Lowney | ............. B23K 26/1411 |
| | | | | 219/121.63 |
| 6,649,866 B2 | * | 11/2003 | Reichmann | ........ B23K 26/0665 |
| | | | | 219/121.84 |
| 7,619,180 B2 | * | 11/2009 | Diem | .................. B23K 26/1482 |
| | | | | 219/121.63 |
| 8,642,919 B2 | * | 2/2014 | Hogan | ..................... 219/121.67 |
| 2003/0226826 A1 | * | 12/2003 | Kobayashi | ............. B23K 26/14 |
| | | | | 219/121.7 |
| 2003/0228123 A1 | * | 12/2003 | Andrews | ................ G02B 6/138 |
| | | | | 385/143 |
| 2004/0099220 A1 | | 5/2004 | Tsao | |
| 2007/0151963 A1 | * | 7/2007 | Tanaka et al. | ........... 219/121.78 |
| 2007/0158318 A1 | * | 7/2007 | Yamazaki et al. | ....... 219/121.76 |
| 2009/0200279 A1 | * | 8/2009 | Li | ............................. 219/121.66 |
| 2009/0208865 A1 | * | 8/2009 | Brunner | .............. G03F 7/70216 |
| | | | | 430/270.1 |

FOREIGN PATENT DOCUMENTS

| | | |
|---|---|---|
| JP | S62-204518 A | 9/1987 |
| JP | H0 1-152718 | 12/1987 |
| JP | S63-140787 A | 6/1988 |
| JP | 2000260730 A | 9/2000 |
| JP | 2002-524263 A | 8/2002 |
| JP | 2005-011941 A | 1/2005 |
| JP | 2007-500447 A | 1/2007 |
| KR | 20020015661 A | 2/2002 |
| KR | 100620505 B1 | 8/2006 |
| WO | 2006/079921 A2 | 8/2006 |

* cited by examiner

PARTICLE CONTROL IN LASER PROCESSING SYSTEMS

CROSS-REFERENCE TO RELATED APPLICATIONS

This application claims benefit of U.S. Provisional Patent Application Ser. No. 61/543,763, filed Oct. 5, 2011, and U.S. Provisional Patent Application Ser. No. 61/599,336, filed Feb. 15, 2012, which are herein incorporated by reference.

BACKGROUND OF THE INVENTION

Field of the Invention

Embodiments disclosed herein relate to an apparatus for manufacturing semiconductor devices. More specifically, an apparatus for laser annealing semiconductor substrates is disclosed.

Description of the Related Art

Thermal annealing is a commonly used technique in semiconductor manufacturing. A process is generally performed on a substrate, for example implanting or doping of the substrate, and then the substrate is subsequently annealed to improve the properties of the substrate. A typical thermal anneal process includes heating a portion of the substrate, or the entire substrate, to an anneal temperature for a period of time.

During the thermal anneal, the material introduced to the substrate typically migrates through the substrate, but some of the material may volatilize into the vapor space above the substrate within the annealing chamber. The volatiles may include elements such as phosphorus, arsenic, and other potentially toxic elements that must be removed from the vapor space before the chamber can be vented into the environment. Additionally, when thermal annealing substrates using lasers having a high fluence, it is possible that portions of the exposed substrate may ablate and undesirably redeposit on the substrate surface or the optics within the thermal annealing system.

Thus, there remains a need for an efficient and cost-effective apparatus for removing undesired thermal annealing byproducts from a thermal annealing apparatus during processing.

SUMMARY OF THE INVENTION

The present invention generally relates to a laser processing systems for thermally processing substrates. The laser processing systems include a shield disposed between an energy source of the laser processing system and a substrate which is to be thermally processed. The shield includes an optically transparent window disposed adjacent to a cavity within the shield. The optically transparent window allows annealing energy to pass therethrough and to illuminate the substrate. The shield also includes one or more gas inlets and one or more gas outlets for introducing and removing a purge gas from the cavity within the shield. The purge gas is utilized to remove volatized or ablated components during thermal processing, and to provide a gas of predetermined composition, such as oxygen-free, to the thermally processed area.

In one embodiment, an apparatus for reducing contamination in a laser processing system comprises a body defining a cavity. The body includes a conical portion with a first end having a first diameter and a second end having a second diameter less than the first diameter, and a cylindrical portion joined to the second end of the conical portion. A transparent window is disposed at the first end of the conical portion.

In another embodiment, an apparatus for reducing contamination in a laser processing system comprises a body defining a cavity. The body has a conical portion with a first end having a first diameter and a second end having a second diameter less than the first diameter. A cylindrical portion is joined to the second end of the conical portion, and a first gas inlet port formed circumferentially around the first end of the conical portion is in fluid communication with the cavity. A second gas inlet port is formed circumferentially around the cylindrical portion of the body and in fluid communication with the cavity. A transparent window is disposed at the first end of the conical portion. The transparent window has a coating thereon that is anti-reflective to radiation having a first wavelength and reflective to radiation having a second wavelength.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present invention generally relates to a laser processing systems for thermally processing substrates. The laser processing systems include a shield disposed between an energy source of the laser processing system and a substrate which is to be thermally processed. The shield includes an optically transparent window disposed adjacent to a cavity within the shield. The optically transparent window allows annealing energy to pass therethrough and to illuminate the substrate. The shield also includes one or more gas inlets and one or more gas outlets for introducing and removing a purge gas from the cavity within the shield. The purge gas is utilized to remove volatized or ablated components during thermal processing, and to provide a gas of predetermined composition, such as oxygen-free, to the thermally processed area.

Figure 1:
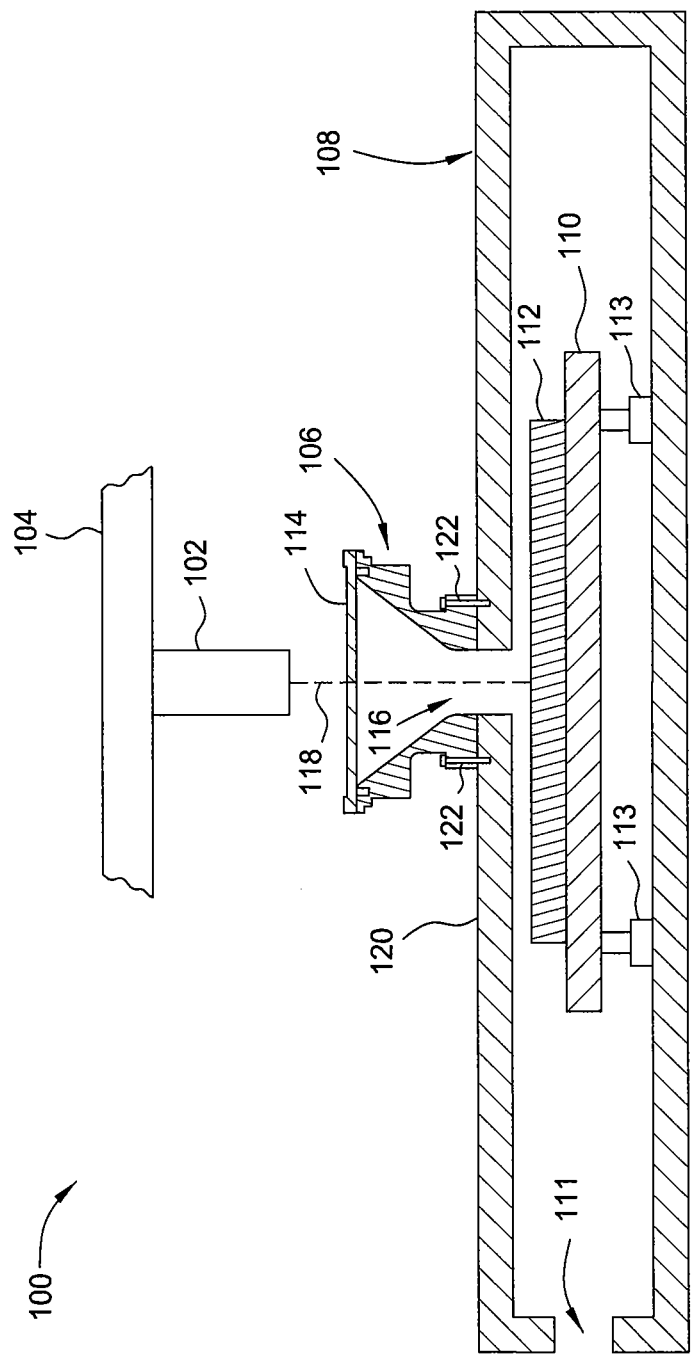
FIG. 1 is a sectional view of a laser processing system according to one embodiment of the invention.

FIG. 1 is a sectional view of a laser processing system 100 according to one embodiment of the invention. The laser processing system 100 includes an energy source 102 coupled to a support 104, such as a lid or bracket. A shield 106 is disposed adjacent to the energy source 102. The shield 106 is coupled to a substrate support enclosure 108 and disposed above a substrate support 110 which supports a substrate 112 thereon. The energy source 102 includes a light source and a lasing medium, such as a laser, which produces thermal processing energy 118 that is directed toward the substrate support 110 through a window 114 and opening 116 positioned within the shield 106. The substrate support 110 may be a precision x-y stage adapted to position the substrate 112 in desired locations relative to the energy source 102. An opening 111, such as a slit valve, is formed within the substrate support enclosure to allow of ingress and egress of substrates 112. It is contemplated that the substrate support 110 may be vertically actuated via actuators 113 to facilitate removal of substrates from the substrate support enclosure 108.

The shield 106 is fastened to an upper surface 120 of the substrate support enclosure 108 by fasteners 122, such as bolts, to maintain the shield 106 in a fixed position during processing. The thermal processing energy 118 is generally coaxially aligned with the window 114 and the opening 116 of the shield 106. The thermal processing energy 118 is directed through the shield 106 to the surface of the substrate 112. The window 114 and the opening 116 are generally large enough to accommodate the thermal processing energy 118 without blocking a portion of the thermal processing energy 118 from reaching the substrate 112. Successive portions of the substrate 112 are positioned to receive the thermal processing energy 118 by moving the substrate support 110 and the substrate 112 positioned thereon. The lower surface of the substrate support enclosure 108 is positioned about 10 microns to about 2 millimeters from the upper surface of the substrate 112 during processing.

Figure 2:
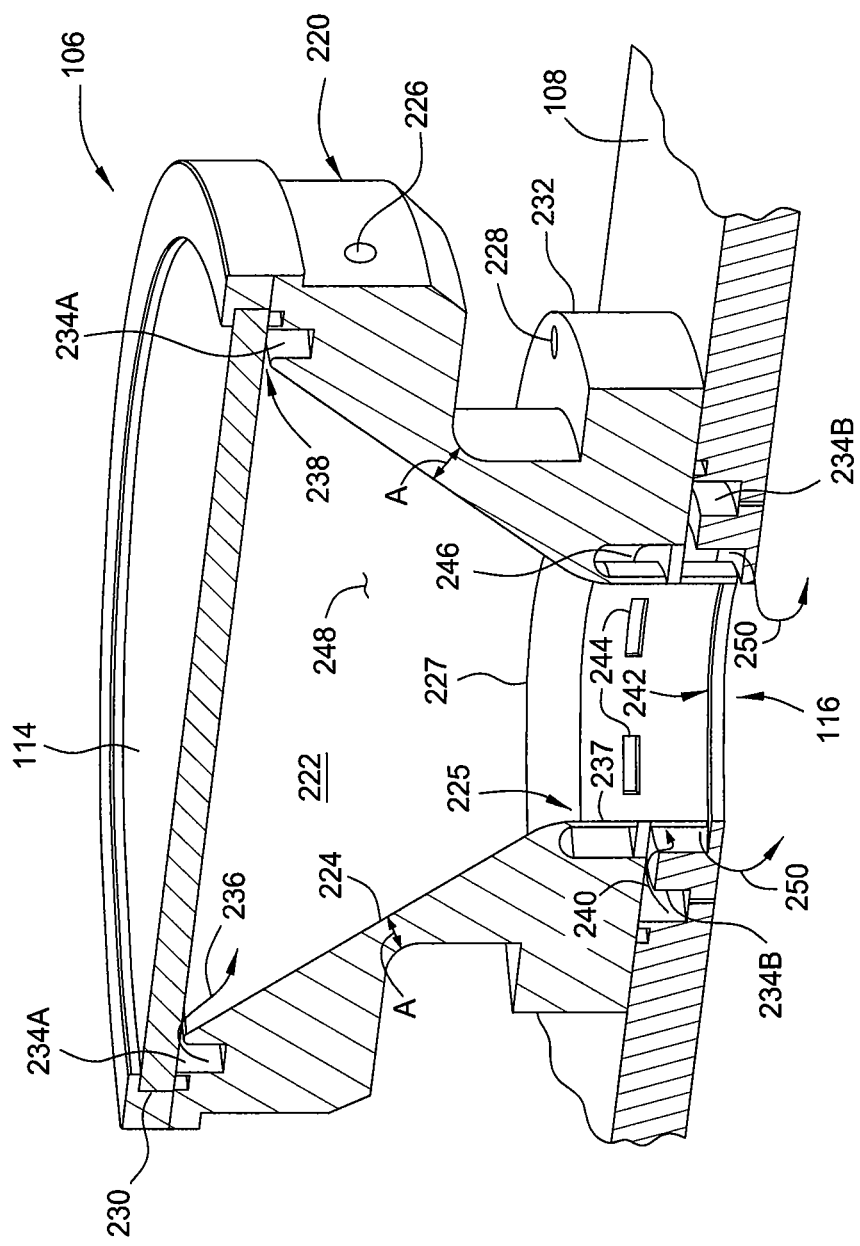
FIG. 2 is an isometric sectional view of a shield according to one embodiment of the invention.

FIG. 2 is an isometric sectional view of a shield 106 according to one embodiment of the invention. The shield 106 includes a body 220 formed from stainless steel or aluminum. The body 220 has a hollow funnel shape defining a cavity 222. The funnel shape of the body 220 includes a conical portion 224 and a cylindrical portion 237. The smaller diameter end 225 of the conical portion 224 transitions into the cylindrical portion 237 at a surface 227, which is rounded or curved. The taper and size of the conical portion 224 may be selected to correspond to the taper and size of the conical shape of an annealing energy beam, when utilizing an annealing energy source which generates a conical-shaped beam.

The window 114 is disposed at the larger diameter end of the conical portion 224 of the body 220 and is positioned within a recess 230. The window 114 is formed from an optically transparent material, such as quartz, sapphire, or fused silica, to allow for annealing energy to pass therethrough, and may have a thickness within a range of about 1 millimeter to about 20 millimeters. In one embodiment, the window 114 may have a coating such as an anti-reflective coating thereon. In another embodiment, the window 114 may have a coating thereon which is anti-reflective at a first wavelength corresponding to wavelength of the thermal processing energy 118 (e.g., a laser band from about 200 nanometers to about 1100 nanometers) and highly-reflective at a second wavelength. The second wavelength may correspond to the wavelength of a pyrometer, for example, about 800 nanometers to about 2.2 microns. A coating on the window 114 which is anti-reflective at a first wavelength and highly-reflective at a second wavelength enhances temperature measurement of the substrate 112 during processing. Temperature measurement of the substrate is enhanced by creating a reflectivity cavity within the body 220 for radiation detected by a pyrometer. The reflectivity cavity enhances the emittance of the target surface and minimizes the error due to uncertainty in emissivity. In one embodiment, the reflectivity of the inner surface 248 of the body 220 may be similar to or the same as the reflectivity of the window 114 at a desired wavelength in order to further enhance metrology.

The opening 116 is disposed at the opposite end of the body 220 compared to the window 114, and may have dimensions of about 100 millimeters by 100 millimeters when accommodating a rectangular beam of about 26 millimeters by about 33 millimeters. Thus, the opening 116 is sufficiently sized to accommodate a beam of light as well as metrology therethrough. The body 220 further includes a flange 232 proximate to the cylindrical portion 237 of the body 220. The flange 232 has openings 228 disposed through to accommodate fasteners, such as bolts, in order to secure the shield 106 to the substrate support enclosure 108. The wall of the body 220 generally has a thickness A of at least about 1 millimeter to about 2 millimeters.

The body 220 includes gas channels 234A and 234B, which are disposed circumferentially around the shield 106, through which a process gas, such as nitrogen, filtered air, argon, or other inert gases, is introduced into the cavity 222. The process gas provided to the gas channel 234A enters the cavity 222 along flow path 236 through a first gas inlet port 238 disposed adjacent to the gas channel 234A circumferentially positioned around the body 220. The first gas inlet port 238 is an orifice extending around the circumference of the body 220 between the window 114 and the inner surface 248. Process gas provided to the gas channel 234B is introduced to the cavity 222 along flow path 240 through a second gas inlet port 242. The second gas inlet port 242 is disposed circumferentially around the cylindrical portion 237 of the body 220 and is in fluid communication with the gas channel 234B. As shown in FIG. 2, the gas channel 234B positioned at the interface of the substrate support enclosure 108 and the flange 232; however, it is contemplated that the gas channel 234B may also be formed within the flange 232. The process gas is removed through gas outlet ports 244 formed though the cylindrical portion 237. The gas outlet ports 244 are in fluid communication with an exhaust gas channel 246 through which gases are exhausted from the shield 106. Vacuum or suction may be applied to the exhaust gas channel 246 to facilitate removal of process gases from the cavity 222.

FIG. 2 illustrates one embodiment of a shield 106 for use during thermal processing; however, other embodiments are also contemplated. In another embodiment, it is contemplated that the cavity 222 may have an entirely cylindrical shape which does not have tapering walls of decreasing diameter. In another embodiment, it is contemplated that the shield 106 may have a rectangular cross section and may be adapted to accommodate a window 114 having a rectangular outline. In another embodiment, it is contemplated that additional ports may be formed through the inner surface 248 for the introduction and removal of process gases from the cavity 222. In another embodiment, it is contemplated that the gas channels 234A, 234B, or the first and second gas inlet ports 238 and 242 may not be an opening positioned around the entire circumference of the shield 106; rather, a plurality of discrete gas channels and/or ports may be positioned at intervals around the cavity 222 of the shield 106. In yet another embodiment, the gas inlet ports 238, 242 may be positioned to form a vortex or helical airflow within the cavity 222. In another embodiment, the window 114 and the opening 116 may be sized to allow for annealing energy to pass therethrough and for metrology units, such as pyrometers, spectrometers, optoacoustic sensors, or reflectometers, to simultaneously measure one or more characteristics of processed substrates through the window 114 and the opening 116.

In yet another embodiment, it is contemplated that the body 220 may optionally include one or more openings 226 through a wall thereof to accommodate a pyrometer field of view. A window may be disposed within the opening 226 to prevent particles generated during processing from escaping through the opening. The inner surface 248 of the body 220 may be coated with a reflective coating such as gold, aluminum or silver to enhance pyrometry within the body 220. The pyrometer may be utilized to measure the amount of radiation within the body 220 within a wavelength range of about 800 nm to about 2.2 microns. The creation of a reflective cavity within the body 220 allows the body 220 to appear more like a blackbody radiator with respect to a pyrometer. The appearance of a black body radiator decreases the dependency on accurate knowledge of the substrate surface emissivity, thereby enhancing substrate temperature measurement.

During processing, the energy source 102 (shown in FIG. 1) provides annealing energy through the window 114 and the cavity 222 of the shield 106 to the surface of a substrate 112 (shown in FIG. 1). Depending on the fluence of the annealing energy, particulate matter such as vaporized dopants or ablated substrate material may be generated during the thermal annealing process. If the vaporized dopants or ablated material are not removed from the process area, the vaporized dopants or the ablated material could undesirably deposit on the window 114 or other system components, thus affecting the uniformity of the annealing energy, or on the substrate, thus affecting device yield. However, the close proximity of the opening 116 to the thermally processed area of the substrate 112 (shown in FIG. 1) directs the vaporized dopants or the ablated material into the shield 106. By positioning the opening 116 close to the upper surface of the substrate 112, the vaporized dopants and the ablated material enter the shield 106 without have the opportunity to be dispersed within the substrate support enclosure. The funnel shape of the cavity 222 of the shield 106 assists in maintaining the vaporized dopants or the ablated material within the cavity 222 once the vaporized dopants or the ablated material have entered the shield 106.

Once the vaporized dopants or the ablated material are inside the shield 106, the vaporized dopants and the ablated material are removed by the process gas entering gas channels 234A, 234B and exiting through exhaust gas channel 246. The process gas entering through gas channel 234B is directed upwards towards the exhaust gas channel 246 to reduce the probability of vaporized dopants or ablated material from exiting the shield 106 after having entered the shield 106. The gas entering through the gas channel 234A is directed downward towards the exhaust gas channel 246 to reduce or prevent deposition of material on the window 114. Furthermore, the gases entering through the gas channel 234A and the gas channel 234B are both directed towards the gas outlet ports 244 to facilitate removal of the gas, and the particles carried thereby, from the shield 106. Thus, the process gas is removed from the shield 106 at a position between the gas channels 234A and 234B. Process gas may be introduced to the cavity 222 through each of the gas channels 234A, 234B at a rate of about 30 SLM to about 50 SLM, and the process gas is removed at about the same rate through the exhaust gas channel 246. Desirably, a laminar flow is maintained within the cavity 222. The inner surface 248 of the body 220 may have a polished surface to reduce the probability of material deposition onto and flaking of material from the inner surface 248. In one example, the surface roughness of the inner surface 248 may be less than 10 micron RMS, such as about 1 micron RMS to about 2 micron RMS.

In addition to removing vaporized dopants and the ablated material from the processing area of a substrate, the shield 106 also reduces the occurrence of contamination at or near the thermally processed portion of the substrate by removing ambient gases from the thermally processed area of the substrate. When thermally processing the substrate, the heated region of the substrate becomes more susceptible to contamination, such as reaction with ambient oxygen or other contaminants in the ambient environment. The shield 106 removes ambient gases from the annealed portion of the substrate by creating a slightly larger pressure gradient within the cavity 222 due to the gases provided thereto. The pressure gradient forces process gas through the opening 116 along flow path 250 away from the annealed portion of the substrate, thus removing ambient oxygen from the annealing area. To create the pressure gradient within the cavity 222, the rates at which gases are introduced or removed from the cavity 222 can be adjusted. Desirably, the outflow of process gas from the shield 106 sufficiently reduces the amount of ambient oxygen near the thermal processed region of the substrate, while still allowing vaporized dopants or ablated material to enter the cavity 222 for removal. Thus, the pressure gradient near the opening 116 need not be relatively large. For example, the pressure gradient may have a delta between about 1 to about 10 Torr, such as about 3 Torr about 5 Torr.

Benefits of the present invention generally include using the shield for reducing contamination on substrates and system optics during thermal annealing processes. The shield assists in the removal of volatized dopants and ablated material from the processing area, thus reducing the probability of the volatized dopants or the ablated material undesirably depositing on system optics or processed substrates. Since less material is deposited on the system optics, process uniformity is more consistent, and the mean time between cleaning or replacement of the optics is extended (for example, greater than every three months). Additionally, since less material undesirably deposits on the processed substrates, device yield is maximized. Furthermore, processes requiring an oxygen free controlled atmosphere can also be accommodated.

While the foregoing is directed to embodiments of the present invention, other and further embodiments of the invention may be devised without departing from the basic scope thereof, and the scope thereof is determined by the claims that follow.

The invention claimed is:
1. An apparatus, comprising:
a substrate support enclosure configured to have a surface for supporting a workpiece inside; and
a body coupled to an upper outer surface of the substrate support enclosure, the body defining a cavity and having:
a conical portion with a first end having a first diameter and a second end having a second diameter less than the first diameter, the conical portion having a tapered inner sidewall between the first end and the second end;
a cylindrical portion joined to the second end of the conical portion, the cylindrical portion extending beyond the upper outer surface of the substrate support enclosure, and the cylindrical portion defining a second gas inlet port adjacent the substrate support enclosure;
a first gas inlet port formed circumferentially around the first end of the conical portion, the first gas inlet port formed in the tapered inner sidewall of the conical portion; and
a transparent window disposed at the first end of the conical portion configured to allow a laser to penetrate the conical portion and pass through the cylindrical portion to contact the workpiece.

2. The apparatus of claim 1, wherein the first gas inlet port is in fluid communication with the cavity.

3. The apparatus of claim 2, further comprising a first gas channel in fluid communication with the first gas inlet port.

4. The apparatus of claim 3, further comprising a gas outlet port in fluid communication with the cavity.

5. The apparatus of claim 4, wherein the gas outlet port is positioned in the cylindrical portion.

6. The apparatus of claim 1, further comprising a flange disposed on an outer surface of the cylindrical portion.

7. The apparatus of claim 6, wherein the flange includes openings disposed therethrough to accommodate fasteners.

8. The apparatus of claim 1, wherein the window comprises quartz, fused silica, or sapphire.

9. The apparatus of claim 1, wherein the body comprises stainless steel or aluminum.

10. The apparatus of claim 1, wherein the transparent window includes a coating thereon, and wherein the coating is anti-reflective to radiation having a first wavelength and reflective to radiation having a second wavelength.

11. The apparatus of claim 10, wherein the first wavelength is within a range of 200 nanometers to 1100 nanometers, and the second wavelength is within a range of 800 nanometers to 2.2 microns.

12. The apparatus of claim 11, wherein the body includes an opening through a wall thereof to accommodate a pyrometry field of view.

13. The apparatus of claim 12, wherein an internal surface of the body includes a coating thereon, the coating selected from a group consisting of gold, silver, and aluminum.

14. An apparatus, comprising:
a substrate support enclosure configured to have a surface for supporting a workpiece inside; and
a body coupled to an upper outer surface of the substrate support enclosure, the body defining a cavity and having:
a conical portion with a first end having a first diameter and a second end having a second diameter less than the first diameter, the conical portion having a tapered inner sidewall between the first end and the second end;
a cylindrical portion joined to the second end of the conical portion, the cylindrical portion extending beyond the upper outer surface of the substrate support enclosure, and the cylindrical portion defining a second gas inlet port adjacent the substrate support enclosure;
a first gas inlet port formed circumferentially around the first end of the conical portion in fluid communication with the cavity, the first gas inlet port formed in the tapered inner sidewall of the conical portion;
a transparent window disposed at the first end of the conical portion adjacent the first gas inlet port configured to allow a laser to penetrate the conical portion and pass through the cylindrical portion to contact the workpiece, the transparent window having a coating thereon that is anti-reflective to radiation having a first wavelength and reflective to radiation having a second wavelength; and
a flange disposed on an outer surface of the cylindrical portion, the flange including a plurality of openings therethrough to accommodate fasteners to fasten the body to the substrate support enclosure.

15. The apparatus of claim 14, wherein the first wavelength is within a range of 200 nanometers to 1100 nanometers, and the second wavelength is within a range of 800 nanometers to 2.2 microns.

16. The apparatus of claim 15, wherein an internal surface of the body includes a coating thereon, the coating selected from a group consisting of gold, silver, and aluminum.

17. The apparatus of claim 16, wherein the body includes an opening through a wall thereof to accommodate a pyrometry field of view.

18. The apparatus of claim 14, wherein the body comprises stainless steel or aluminum.

19. The apparatus of claim 18, wherein the window comprises quartz, fused silica, or sapphire.

* * * * *